(12) United States Patent
Suzuki

(10) Patent No.: US 7,210,644 B1
(45) Date of Patent: May 1, 2007

(54) CARTRIDGE CASE AND INFORMATION RECORDING MEDIUM

(75) Inventor: Hiroki Suzuki, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/345,513

(22) Filed: Feb. 2, 2006

(51) Int. Cl.
*G11B 15/66* (2006.01)

(52) U.S. Cl. .................... 242/332.4; 242/348
(58) Field of Classification Search ............ 242/332.4, 242/348; 360/132
See application file for complete search history.

(56) References Cited

U.S. PATENT DOCUMENTS

| 5,587,860 A | * | 12/1996 | Umebayashi et al. |
| 2005/0263638 A1 | | 12/2005 | Suzuki et al. |
| 2005/0274839 A1 | | 12/2005 | Suzuki et al. |

FOREIGN PATENT DOCUMENTS

| JP | 61-199267 | * | 9/1986 |
| JP | 2001-195864 | | 7/2001 |
| JP | 2003-036628 | | 2/2003 |
| JP | 2003-346455 | * | 5/2003 |

OTHER PUBLICATIONS

U.S. Appl. No. 11/090,018, to Suzuki et al., which was filed on Mar. 28, 2005.
English language Abstract of JP 2001-195864.
English language Abstract of JP 2003-036628.

* cited by examiner

*Primary Examiner*—William A. Rivera
(74) *Attorney, Agent, or Firm*—Greenblum & Bernstein, P.L.C.

(57) ABSTRACT

A cartridge case includes a first case and a second case that are fitted together to form a cartridge body capable of housing an information recording carrier therewithin. The first case is constructed by attaching a reference hole forming member, in which a positioning reference hole is formed, to a main plate of the first case.

6 Claims, 3 Drawing Sheets

CARTRIDGE CASE AND INFORMATION RECORDING MEDIUM

BACKGROUND OF THE INVENTION

1. Field of the Invention

The present invention relates to a cartridge case that includes a first case provided with a positioning reference hole and a second case and is constructed so as to house an information recording carrier, and to an information recording medium where an information recording carrier is included inside such cartridge case.

2. Description of the Related Art

As one example of an information recording medium where an information recording carrier is housed inside a cartridge case, Japanese Laid-Open Patent Publication No. 2001-195864 discloses a magnetic tape cartridge (hereafter, simply "tape cartridge"). The tape cartridge is constructed with a reel, around which magnetic tape (an information recording carrier) is wound, rotatably housed inside a cartridge case that includes a lower case (first case) and an upper case (second case). When the tape cartridge is loaded in a recording/reproducing apparatus, the magnetic tape is pulled out of the cartridge case and subjected to recording and reproducing. Reference holes for positioning the cartridge case at a predetermined recording/reproducing position in the recording/reproducing apparatus are formed in a baseplate of the lower case. During the recording/reproducing process, in a state where positioning pins are inserted into the reference holes to position the cartridge case at a recording/reproducing position inside the recording/reproducing apparatus, the magnetic tape is pulled out from the cartridge case and the magnetic tape is wound back from inside the cartridge case.

On the other hand, by investigating the tape cartridge (cartridge case) described above, the present inventor discovered the following problem. That is, with this type of tape cartridge, the reference holes are formed in the cartridge case so that when the cartridge case is loaded into a recording/reproducing apparatus during the recording/reproducing process, positioning pins are inserted into the reference holes after the cartridge case has been conveyed to the recording/reproducing position by a loading mechanism. At this time, as shown in FIG. 5, due to extremely small displacements of the cartridge case 2x (in the following description, component elements of the conventional tape cartridge are indicated by attaching "x" to the reference numerals) relative to the loading mechanism (not shown), a front end portion of a positioning pin Px may contact and catch on a rim portion of a reference hole 27x as shown by the broken line in FIG. 5. As this type of tape cartridge is easy to mold and resistant to thermal deformation and the like, the cartridge case 2x(the upper case and lower case 2bx) is injection molded using polycarbonate, for example. This means it is difficult for the positioning pins Px to slide on the cartridge case 2x.

Accordingly, when the tape cartridge is used repeatedly, there is the problem of damage being caused to the rim portions of the reference holes 27x(i.e., the surface of the baseplate 2cx) of the lower case 2bx due to the positioning pins Px catching thereon. If the positioning pins Px catch on the surface, the loading mechanism repeatedly carries out the conveying process (loading process) for the cartridge case 2x until the positioning pins Px are properly inserted into the reference holes 27x. As a result, there is a problem of a long time being required from the loading of the tape cartridge into the recording/reproducing apparatus until the start of the recording/reproducing process. Also, the recording/reproducing apparatus described above is constructed so that when the number of repeated executions of the loading process reaches a predetermined number, it is determined that a "loading error" has occurred and the recording/reproducing process on the tape cartridge is suspended. Accordingly, when a backup process for recording data is carried out on a data server using a tape cartridge as a backup medium, for example, there is the risk of a major accident where the occurrence of a loading error prevents the backup process from starting at a predetermined time.

On the other hand, when the entire cartridge case 2x (the lower case 2bx) is made of a metal material, for example, to avoid damage to the rim portions of the reference holes 27x of the lower case 2bx, there is the problem of a large increase in the manufacturing cost. To prevent loading errors from occurring, the entire cartridge case 2x (the lower case 2bx) may be molded using various types of resin materials on which the positioning pins Px can slide favorably when the positioning pins Px contact the reference holes 27x, but doing so carries the risk of a fall in strength and also of thermal deformation of the cartridge case 2x (the lower case 2bx) when the cartridge case is exposed to high temperatures inside the recording/reproducing apparatus or the like.

SUMMARY OF THE INVENTION

The present invention was conceived in view of the problem described above and it is a principal object of the present invention to provide a cartridge case and an information recording medium that can avoid at least one of damage to a rim portion of a reference hole and the occurrence of loading errors, without leading to a fall in strength, thermal deformation or a large increase in manufacturing cost.

To achieve the stated object, a cartridge case according to the present invention includes a first case and a second case that are fitted together to form a cartridge body capable of housing an information recording carrier therewithin, wherein the first case is constructed by attaching a reference hole forming member, in which a positioning reference hole is formed, to a main plate of the first case. Note that the expression "positioning reference hole" for the present invention is not limited to a concave that extends partially through the main plate so that a base surface is formed on the inside in an insertion direction for a positioning pin and also includes an aperture that extends completely through the main plate. According to the above cartridge case, to avoid the occurrence of loading errors due to a positioning pin catching on the rim portion of the positioning reference hole, a reference hole forming member molded from a resin material or the like with favorable sliding characteristics is attached to the first case to make it possible for the positioning pin to be smoothly inserted inside the positioning reference hole. Also, by forming the reference hole forming member from a material with superior abrasion resistance, such as metal or ceramic, and attaching the reference hole forming member to the first case, it is possible to avoid damage to the rim portion of the positioning reference hole due to the positioning pin catching thereupon. Accordingly, unlike a construction where the entire cartridge case is molded from polyacetal resin or the like, it is possible to avoid the occurrence of loading errors while also avoiding a reduction in strength and thermal deformation of the cartridge case. Also, unlike a construction where the entire cartridge case is formed of metal or the like, it is possible to avoid damage to the rim portion of the positioning reference hole without a large increase in manufacturing cost.

Also, according to a cartridge case according to the present invention, the reference hole forming member may be provided with a brim portion at a rim portion of the positioning reference hole. According to this cartridge case, when the reference hole forming member is molded from a material with favorable sliding characteristics, such as polyacetal resin, the sliding characteristics become favorable in a wide range (the range of the brim portion) around the positioning reference hole, and as a result, even if the positioning pin contacts a position somewhat distant from the positioning reference hole, it is possible to smoothly slide the positioning pin and insert the positioning pin inside the positioning reference hole. Also when the reference hole forming member is molded from a material with superior abrasion resistance, such as metal, it is possible to improve the abrasion resistance in a wide range (the range of the brim portion) around the positioning reference hole, and as a result, even if the positioning pin contacts a position somewhat distant from the positioning reference hole and is caused to slide toward the positioning reference hole, it is possible to avoid great damage to the rim portion of the positioning reference hole due to the positioning pin.

In the cartridge case according to the present invention, the reference hole forming member may be molded from a resin material and is welded to the main plate of the first case. According to this cartridge case, unlike a construction where the reference hole forming member is fixed to the first case by applying adhesive, for example, it is possible to reliably avoid detachment of the reference hole forming member from the first case even though a comparatively simple fixing method is used.

Also, in the cartridge case according to the present invention, the reference hole forming member may be molded from polyacetal resin. According to this cartridge case, even though a comparatively low-cost resin material is used, it is possible to smoothly slide a positioning pin that has contacted a rim portion of the positioning reference hole and insert the positioning pin into the reference hole forming member.

In addition, the information recording medium according to the present invention includes the cartridge case described above and the information recording carrier housed inside the cartridge case. According to this information recording medium, to avoid the occurrence of loading errors due to a positioning pin catching on the rim portion of the positioning reference hole, a reference hole forming member molded from a resin material or the like with favorable sliding characteristics is attached to the first case to make it possible for the positioning pin to be smoothly inserted inside the positioning reference hole. Also, by forming the reference hole forming member from a material with superior abrasion resistance, such as metal or ceramic, and attaching the reference hole forming member to the first case, it is possible to avoid damage to the rim portion of the positioning reference hole due to the positioning pin catching. Accordingly, unlike a construction where the entire cartridge case is molded from polyacetal resin or the like, it is possible to manufacture an information recording medium that can prevent loading errors from occurring while avoiding a reduction in strength and thermal deformation of the cartridge case. Also, unlike a construction where the entire cartridge case is formed of metal or the like, it is possible to avoid damage to the rim portion of the positioning reference hole without leading to a large increase in manufacturing cost.

BRIEF DESCRIPTION OF THE DRAWINGS

These and other objects and features of the present invention will be explained in more detail below with reference to the attached drawings, wherein.

DESCRIPTION OF THE PREFERRED EMBODIMENTS

Preferred embodiments of a cartridge case and an information recording medium according to the present invention will now be described with reference to the attached drawings.

Figure 1:
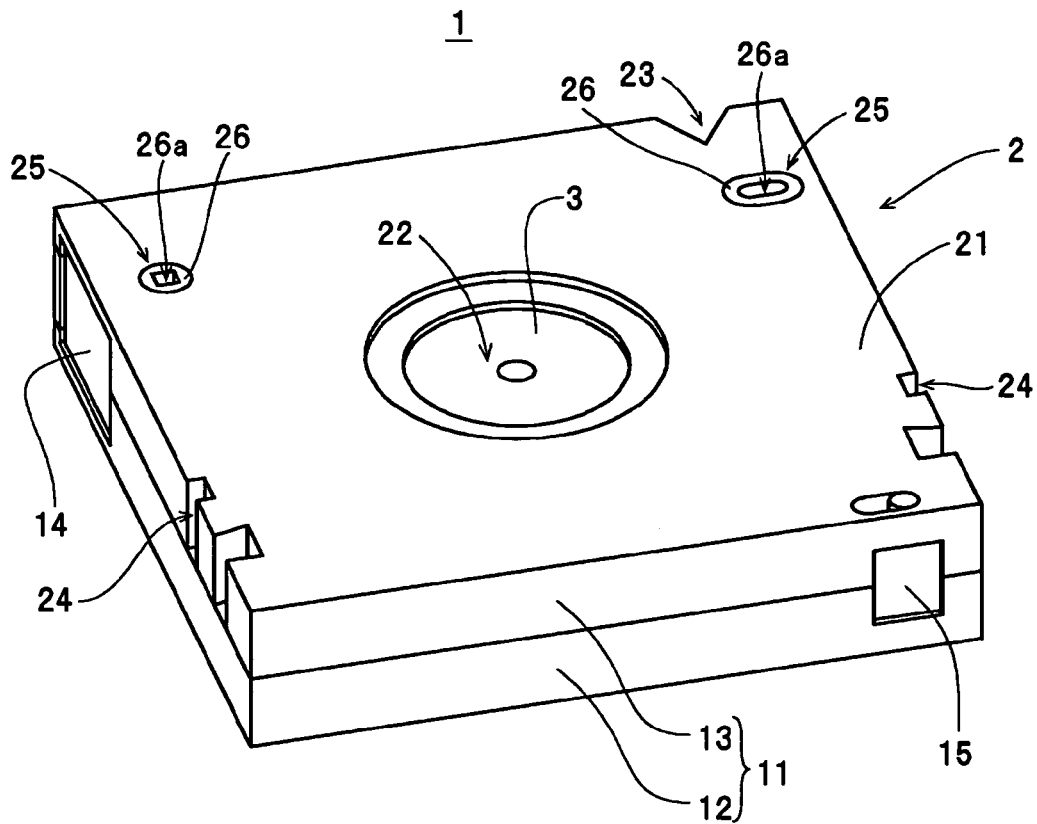
FIG. 1 is a perspective view of a tape cartridge (cartridge case)

The tape cartridge 1 shown in FIG. 1 is one example of an information recording medium according to the present invention and is constructed with a tape reel 3 around which a magnetic tape (not shown) corresponding to an information recording carrier for the present invention is wound is rotatably housed inside a cartridge case 2. The cartridge case 2 includes a case body 11 for housing the tape reel 3 and the like, a shutter member 14 slidably attached to the case body 11, an erase protection tab 15 slidably attached to the case body 11, and the like. The case body 11 includes an upper case 12 and a lower case 13 formed so as to be capable of being fitted together.

Here, the upper case 12 corresponds to a "second case" for the present invention and as one example is entirely formed by injection molding polycarbonate. On the other hand, the lower case 13 corresponds to a "first case" for the present invention and as one example is entirely formed by injection molding polycarbonate in the same way as the upper case 12. Also, a circular aperture 22 that enables chucking of the tape reel 3 housed inside the cartridge case 2 is formed in a baseplate 21 (a "main plate" for the present invention) of the lower case 13. Positioning concave parts 23, 24, 24 for positioning the cartridge case 2 at a predetermined recording/reproducing position when the tape cartridge 1 is loaded into a recording/reproducing apparatus (not shown) are formed in the lower case 13. The lower case 13 is also provided with reference pin insertion portions 25 by attaching two reference hole forming members 26 that are molded separately to the lower case 13 to the baseplate 21.

Figure 2:
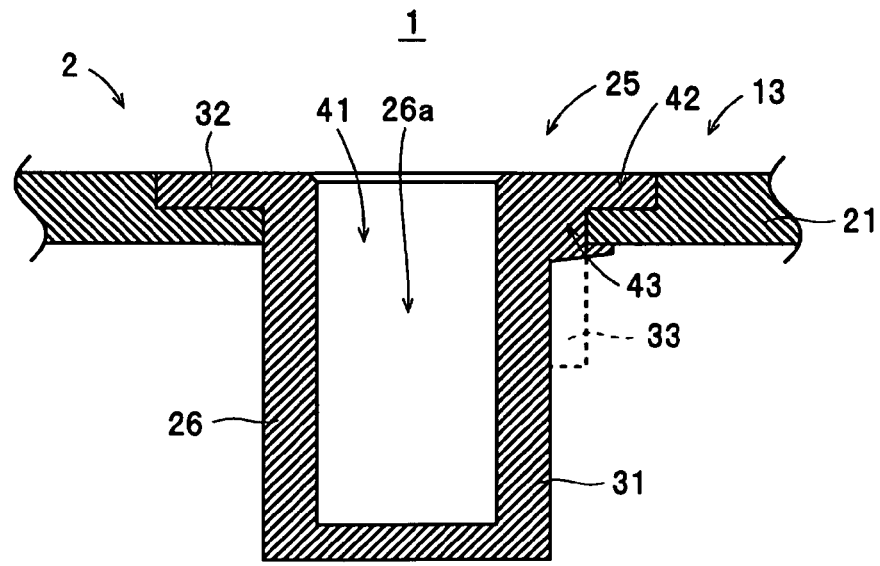
FIG. 2 is a cross-sectional view of a vicinity of a reference pin insertion portion of the tape cartridge (cartridge case)
Figure 3:
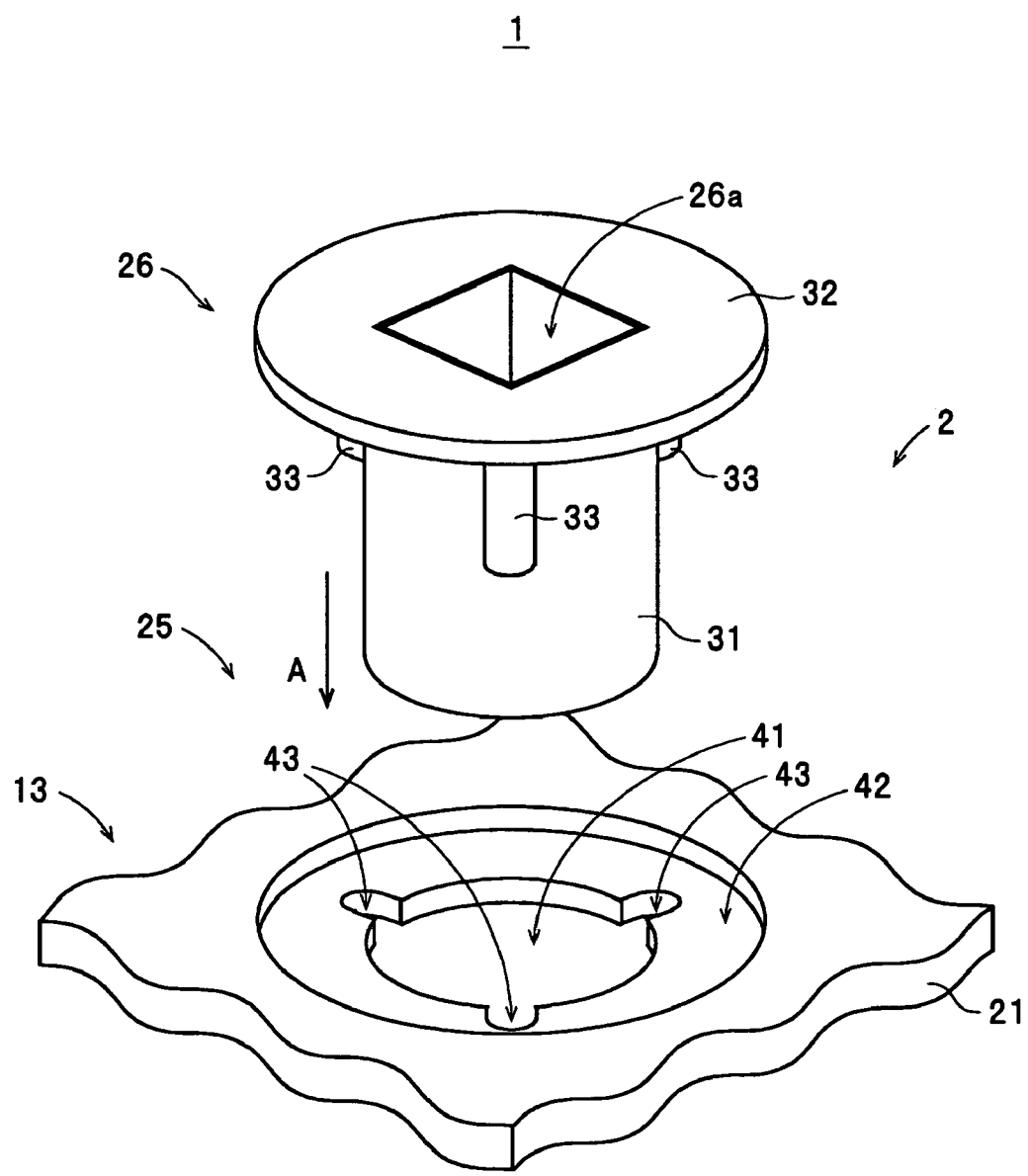
FIG. 3 is a perspective view of the vicinity of an attachment hole in a lower case and a reference hole forming member.

In this case, as shown in FIGS. 2 and 3, the reference hole forming members 26 are formed by injection molding a resin material and integrally include cylindrical portions 31 in the form of bottomed cylinders in whose centers reference holes 26a are formed and brim portions 32 provided at rim portions (end portions of the cylindrical portions 31) of the reference holes 26a. To enable positioning pins to slide favorably, as one example a resin material produced by mixing at least one of fluorine and silicon in polyacetal resin is used as the resin material for molding the reference hole forming members 26. In addition, three ribs 33 for restricting rotation of the reference hole forming members 26 with respect to the lower case 13 are formed on each of the circumferential surfaces of the cylindrical portions 31 of the reference hole forming members 26. Note that the reference hole forming members for the present invention are not limited to being cylindrical like the reference hole forming members 26, and it is possible to use a construction where the lengths of the cylindrical portions 31 are reduced to make the reference hole forming members 26 ring-like in overall shape. On the other hand, attachment holes 41 of a size through which the cylindrical portions 31 of the reference hole forming members 26 can be inserted are formed in the baseplate 21 of the lower case 13. Also, a concave portion 42 whose depth is substantially equal to the thickness of the brim portions 32 of the reference hole forming members 26 and three cutaway portions 43 that can engage the ribs 33 of the reference hole forming members 26 are formed at each rim portion of the attachment holes 41.

When the tape cartridge 1 (the cartridge case 2) is manufactured, first, the upper case 12, the lower case 13, the shutter member 14, the erase protection tab 15 and the reference hole forming members 26 are respectively injection molded. At this time, the upper case 12 and the lower case 13 are injection molded using polycarbonate that has high strength, is easy to mold, and is resistant to thermal deformation. The shutter member 14 and the erase protection tab 15 that are caused to slide with respect to the case body 11 are injection molded using polyacetal resin or the like to avoid abrasion during sliding. In addition, as described above, the reference hole forming members 26 are injection molded using a resin material produced by mixing at least one of fluorine and silicon in polyacetal resin. Next, the cylindrical portions 31 of the reference hole forming members 26 are inserted into the attachment holes 41 of the baseplate 21 of the lower case 13 in the direction of the arrow A shown in FIG. 3. At this time, the respective ribs 33 formed on the circumferential surfaces of the cylindrical portions 31 engage the cutaway portions 43 formed in the rim portions of the attachment holes 41 and restrict rotation of the reference hole forming members 26 with respect to the lower case 13. Also, as shown in FIG. 2, the brim portions 32 of the reference hole forming members 26 fit inside the concave portions 42 formed in the baseplate 21, resulting in the surfaces of the reference hole forming members 26 becoming flush with the surface of the baseplate 21.

Next, by melting parts of the ribs 33 shown by the broken line in FIG. 2 using a thermal bonding device (not shown) and applying pressure to the ribs 33 toward the rear surface of the baseplate 21 so that the ribs 33 spread outward, the reference hole forming members 26 are welded to the baseplate 21 of the lower case 13 as shown in FIG. 2. By doing so, the attachment of the reference hole forming members 26 is completed. Next, in a state where the tape reel 3 around which magnetic tape is wound, the shutter member 14, the erase protection tab 15, and the like have been set on the lower case 13, the upper case 12 and the lower case 13 are fitted together and attached using screws. By doing so, as shown in FIG. 1, the tape cartridge 1 is completed.

With the tape cartridge 1, to enable the positioning pins to slide favorably, the reference hole forming members 26, which have been injection molded using a resin material produced by mixing at least one of fluorine and silicon in polyacetal resin, are attached to the lower case 13 to provide the reference pin insertion portions 25 on the baseplate 21. Accordingly, when the tape cartridge 1 is loaded in a recording/reproducing apparatus (not shown), even if the front end portions of positioning pins (not shown) contact the rim portions of the reference holes 26a due to an extremely small displacement of the cartridge case 2 with respect to a loading mechanism, the positioning pins can slide favorably on the rim portions of the reference holes 26a (i.e., the brim portions 32 of the reference hole forming members 26), and therefore the positioning pins can be smoothly inserted inside the reference holes 26a without leading to a state where the positioning pins catch on the rim portions of the reference holes 26a. On the other hand, in place of the reference hole forming members 26 described above, by attaching reference hole forming members 26 (not shown) formed of a metal material, for example, to the baseplate 21 of the lower case 13, it is possible to avoid damage to the rim portions of the reference holes 26a (i.e., the brim portions 32 of the reference hole forming members 26) even after repeated use of the tape cartridge 1.

In this way, according to the cartridge case 2 and the tape cartridge 1, by constructing the lower case 13 by attaching the reference hole forming members 26 in which the reference holes 26a are formed to the baseplate 21, to avoid the occurrence of loading errors due to the positioning pins catching on the rim portions of the reference holes 26a, by attaching the reference hole forming members 26 molded from a resin material or the like with favorable sliding characteristics to the lower case 13, it is possible to smoothly insert the positioning pins inside the reference holes 26a. Also, by forming the reference hole forming members 26 of a material such as metal or ceramic, for example, with superior abrasion resistance and attaching such reference hole forming members 26 to the lower case 13, it is possible to avoid damage to the rim portions of the reference holes 26a due to the positioning pins catching. Accordingly, unlike a construction where the entire cartridge case is molded from polyacetal resin or the like, it is possible to manufacture the tape cartridge 1 that can prevent loading errors from occurring while avoiding a reduction in strength and thermal deformation of the cartridge case 2. Also, unlike a construction where the entire cartridge case 2 is formed of metal or the like, it is possible to avoid damage to the rim portions of the reference holes 26a without a large increase in manufacturing cost.

Also, according to the cartridge case 2, by providing the brim portions 32 at the rim portions of the reference holes 26a of the reference hole forming members 26, when the reference hole forming members 26 are molded from polyacetal resin or the like, favorable sliding characteristics are provided for a wide range (the range of the brim portions 32) around the reference holes 26a, and as a result, even if the positioning pins contact positions somewhat distant from the reference holes 26a, the positioning pins can be caused to slide smoothly and inserted into the reference holes 26a. In addition, when the reference hole forming members 26 are molded using metal or the like, it is possible to improve the abrasion resistance in a wide range (the range of the brim portions 32) around the reference holes 26a, and as a result, even if the positioning pins contact positions somewhat distant from the reference holes 26a and are caused to slide toward the reference holes 26a, it is possible to prevent the rim portions of the reference holes 26a from being greatly damaged by the positioning pins.

According to the cartridge case 2, the reference hole forming members 26 are molded from a resin material and by welding the reference hole forming members 26 to the baseplate 21 of the lower case 13, unlike a construction where the reference hole forming members 26 are fixed to the lower case 13 by applying adhesive, for example, it is possible to reliably avoid detachment of the reference hole forming members 26 from the lower case 13 even though a comparatively simple fixing method is used.

Also, according to the cartridge case 2, by molding the reference hole forming members 26 from polyacetal resin, even though a comparatively low-cost resin material is used, it is possible to cause positioning pins that have contacted rim portions of the reference holes 26*a* to slide smoothly so that the positioning pins are inserted into the reference hole forming members 26.

Figure 4:
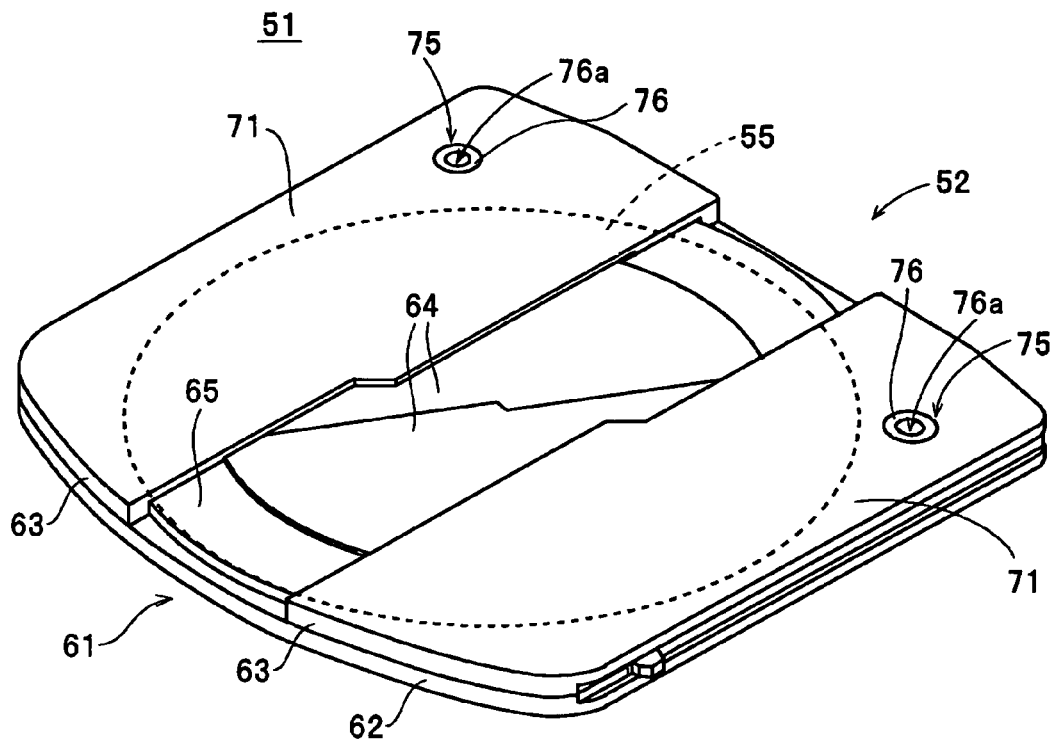
FIG. 4 is a perspective view of a disk cartridge (cartridge case)
Figure 5:
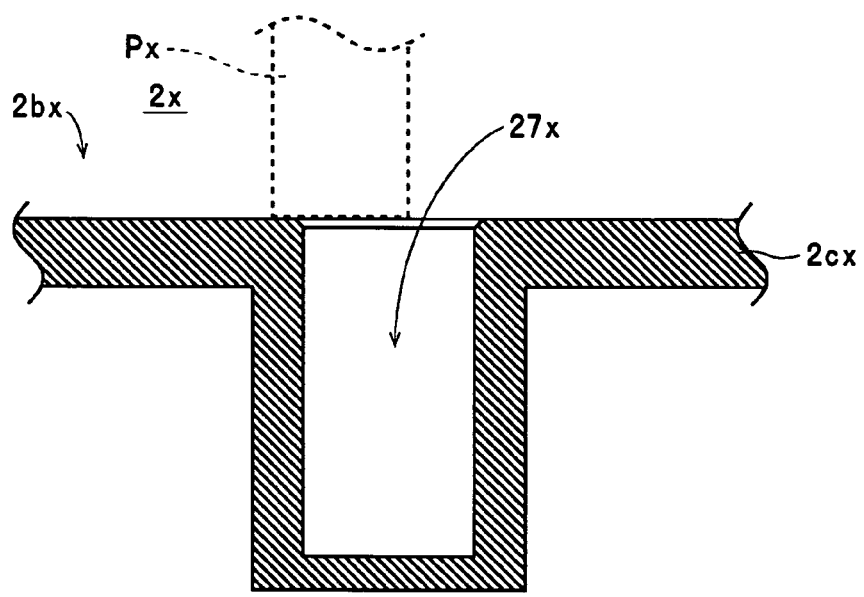
FIG. 5 is a cross-sectional view of the vicinity of a reference hole in a conventional tape cartridge (cartridge case).

It should be noted that the present invention is not limited to the above construction. For example, although the tape cartridge 1 where a magnetic tape is housed inside the cartridge case 2 has been described as one example of the information recording medium according to the present invention, the present invention is not limited to a medium where a tape-shaped information recording carrier is housed inside a cartridge case and includes an information recording medium where various types of information recording carriers such as a disk-shaped magnetic recording medium, a disk-shaped optical recording medium, a disk-shaped magneto-optical recording medium, and/or semiconductor elements of various forms are housed in a cartridge case. More specifically, like a disk cartridge 51 shown in FIG. 4, it is possible to construct an information recording medium according to the present invention by enclosing an optical disk 55 inside a cartridge case 52. In the disk cartridge 51, the cartridge case 52 is constructed of a case body 61 including an upper shell 62 corresponding to the second case for the present invention and two lower shells 63 corresponding to the first case, two shutter members 64 attached to the case body 61, and a disk-shaped disk tray 65. Also, reference pin insertion portions 75 to which reference hole forming members 76, in whose centers reference holes 76*a* are formed, are attached to baseplates 71 of the lower shells 63.

According to the disk cartridge 51 (the cartridge case 52), in the same way as the tape cartridge 1 described above, by constructing the lower shell 63 by attaching the reference hole forming members 76 in which the reference holes 76*a* are formed to the baseplate 71, since the reference hole forming members 76, which are molded from a resin material or the like with favorable sliding characteristics, are attached to the lower shell 63 to prevent loading errors from occurring due to the positioning pins catching on the rim portions of the reference holes 76*a*, for example, the positioning pins can be smoothly inserted inside the reference holes 76*a*. Also, by attaching the reference hole forming members 76, which are formed of a material with superior abrasion resistance such as metal or ceramic, to the lower shell 63, it is possible to avoid damage to the rim portions of the reference holes 76*a* due to the positioning pins catching. Accordingly, unlike a construction where the entire cartridge case is molded from polyacetal resin or the like, it is possible to manufacture a disk cartridge 51 that can avoid the occurrence of loading errors while avoiding a reduction in strength and thermal deformation of the cartridge case 52. In addition, unlike a construction where the entire cartridge case is formed of metal or the like, it is possible to avoid damage to the rim portions of the reference holes 76*a* without a large increase in manufacturing cost.

What is claimed is:

1. A cartridge case comprising a first case and a second case that are fitted together to form a cartridge body capable of housing an information recording carrier therewithin, wherein:

a reference hole forming member, in which a positioning reference hole is formed, is attached to a main plate of the first case; and the reference hole forming member is molded from a resin material.

2. A cartridge case according to claim 1, wherein the reference hole forming member is provided with a brim portion at a rim portion of the positioning reference hole.

3. A cartridge case according to claim 1, wherein the reference hole forming member is welded to the main plate of the first case.

4. A cartridge case according to claim 1, wherein the reference hole forming member is molded from polyacetal resin.

5. An information recording medium comprising a cartridge case according to claim 1 and the information recording carrier housed inside the cartridge case.

6. A cartridge case according to claim 1, wherein the reference hole forming member is attached to a main plate of the first case only.

* * * * *